3,583,981

Patented June 8, 1971

3,583,981
CAPROLACTAM PHOSPHONATES
Abdul-Munim Nashu, Hamden, Adnan A. R. Sayigh, North Haven, and Henri Ulrich, Northford, Conn., assignors to The Upjohn Company, Kalamazoo, Mich.
No Drawing. Filed Sept. 4, 1969, Ser. No. 855,396
Int. Cl. C07d 41/06
U.S. Cl. 260—239.3A          5 Claims

ABSTRACT OF THE DISCLOSURE

This invention is of a novel group of trimethyl-ε-caprolactam phosphonates which are useful flame retarding components for polyurethane and polyamide foam systems.

BACKGROUND OF THE INVENTION

(1) Field of the invention

This invention relates to novel caprolactam phosphonates and is more particularly concerned with novel trimethyl-ε-caprolactam phosphonates and with methods for their preparation and with their use as fire retarding components of polyurethane, polyamide and like polymers.

SUMMARY OF THE INVENTION

The invention comprises a novel group of compounds represented by the formulae:

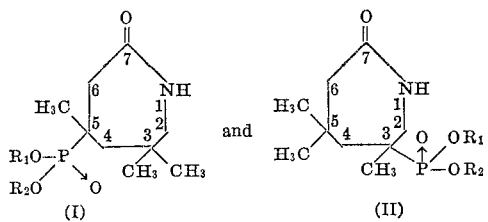

wherein compounds of the Formulae I and II are isomeric forms of each other. These compounds are named hereinafter as derivatives of hexahydro-2H-azepine. For example, the compound of Formula I wherein $R_1$ and $R_2$ both represent ethyl is named as O,O'-diethyl 3,3,5-trimethylhexahydro-2H-azepin-7-on-5-yl phosphonate. The corresponding compound of Formula II; ($R_1=R_2=$ethyl) is named as O,O-diethyl 3,5,5-trimethylhexahydro-2H-azepin-7-on-3-yl phosphonate.

In compounds of the Formulae I and II, $R_1$ and $R_2$ when taken individually are members selected from the group consisting of hydrogen, lower hydrocarbyl, lower halohydrocarbyl, and lower-hydroxyhydrocarbyl. When $R_1$ and $R_2$ are taken together, they represent alkylene from 2 to 10 carbon atoms, inclusive, haloalkylene from 2 to 10 carbon atoms, inclusive, and hydroxyalkylene from 2 to 10 carbon atoms, inclusive, bridging the oxygen atoms to which $R_1$ and $R_2$ are attached, with 1 to 3 carbon atoms of said alkylene, haloalkylene and hydroxyalkylene chain separating said oxygen atoms.

The term "lower hydrocarbyl" means the monovalent radical obtained by removing one hydrogen atom from the parent hydrocarbon which latter contains from 1 to 12 carbon atoms. Illustrative of lower hydrocarbyl are lower alkyl such as methyl, ethyl, propyl, butyl, pentyl, hexyl, heptyl, octyl, nonyl, decyl, undecyl, dodecyl, including isomeric forms thereof; aralkyl such as benzyl, phenethyl, phenylpropyl, naphthylmethyl, and the like; aryl such as phenyl, tolyl, xylyl, naphthyl, biphenylyl, and the like; cycloalkyl such as cyclobutyl, cyclopentyl, cyclohexyl, cycloheptyl, cyclooctyl, and the like, including isomeric forms thereof; cycloalkenyl such as cyclopentenyl, cyclohexenyl, cycloheptenyl, cyclooctenyl, and the like, including isomeric forms thereof.

The term "lower halohydrocarbyl" means lower hydrocarbyl as above defined in which any one or all hydrogen atoms have been replaced by a halogen atom, i.e. by chlorine, bromine, fluorine, and/or iodine. Illustrative of lower halohydrocarbyl are chloroethyl, chlorobenzyl, fluorophenyl, trichloromethyl, bromocyclobutyl, bromocyclopentenyl and the like.

The term "lower hydroxyhydrocarbyl" means lower hydrocarbyl as above defined in which at least one hydrogen atom has been replaced by a hydroxy group. Illustrative of lower hydroxyhydrocarbyl are hydroxyethyl, dihydroxyphenyl, hydroxycyclobutyl, hydroxycyclopentenyl, hydroxybenzyl, tri(methylolyl)methyl, and the like.

The term "alkylene from 2 to 10 carbon atoms, inclusive" means a divalent aliphatic saturated hydrocarbon moiety of the stated carbon atom content, for example, ethylene, 1,3-propylene, 1,2-propylene, 2-ethyl-1,3-butylene, 2,4-hexylene, 4,5-decylene, and the like.

The term "haloalkylene from 2 to 10 carbon atoms, inclusive" means alkylene from 2 to 10 carbon atoms, inclusive as above defined, wherein any or all hydrogen atoms are substituted by halogen atoms, i.e. by chlorine, bromine, fluorine and/or iodine.

The term "hydroxyalkylene from 2 to 10 carbon atoms, inclusive" means alkylene from 2 to 10 carbon atoms, inclusive as defined above having at least one hydrogen replaced by a hydroxy group, such as, for example, 1,2,3-trihydroxypropylene-1,3,1-hydroxyethylene, 2,2 - dihydroxypropylene-1,3, 2,2-diethyl - 1 - hydroxyhexylene-1,3 and the like.

The compounds of the invention of Formulae I and II, either as individual compounds or in admixture, are useful as flame retarding components of polymer systems, more particularly as components of polyurethane and polyamide foam systems. Illustratively, the compounds of Formulae I and II can be used as comonomers for polyamide foams, lending flame retardancy to said foams. The use of phosphorus compounds as flame retardants in foam systems is well-known and is described, for example in "Polyurethanes: Chemistry and Technology, Part II" Saunders and Frisch, Interscience Publishers, New York, 1964, pages 222–225. The compounds of Formulae I and II wherein the groups $R_1$ and $R_2$ contain free hydroxy groups are particularly useful in the preparation of fire retardant polyurethanes since said compounds, by virtue of the reaction of the hydroxyl groups therein with the polyisocyanate employed in the preparation of the polyurethane, become chemically incorporated in the resulting polymer molecules.

DETAILED DESCRIPTION OF THE INVENTION

The compounds of the invention of Formulae I and II are prepared by the rearrangement of the corresponding oxime (III) using the well-known Beckmann reaction, described by, for example, Krauch et al. in "Organic Name Reactions" John Wiley & Sons, N.Y., 1964, pages 38–43. The formation of compounds (I) and (II) is illustrated schematically as follows:

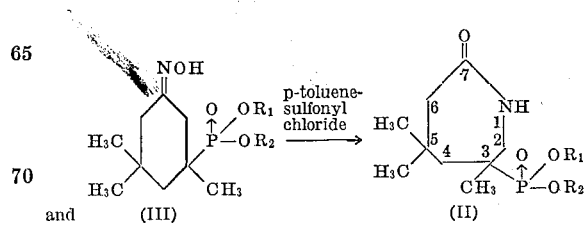

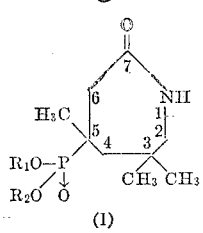

(I)

wherein $R_1$ and $R_2$ have the significance hereinbefore attributed to them.

The reaction occurs conveniently when p-toluenesulfonyl chloride is used as the rearrangement agent and pyridine as solvent. The reactants are added gradually in small portions, using conventional cooling techniques to control the exotherm. Using standard methods to separate the product from solvent, a mixture of the compounds of the Formulae I and II is obtained in good yield. The mixture of compounds (I) and (II) so obtained can, if desired, be separated into its component parts by conventional procedures such as by fractional crystallization, vapor phase chromatography, counter-current distribution and the like.

The starting oximes of the Formula III, some of which are novel in themselves, are prepared using techniques well-known in the art; for example, by reacting the corresponding 3,5,5-trimethyl cyclohexane-1-on-3-yl phosphonate (IV) with hydroxylamine. The reaction is illustrated by the following:

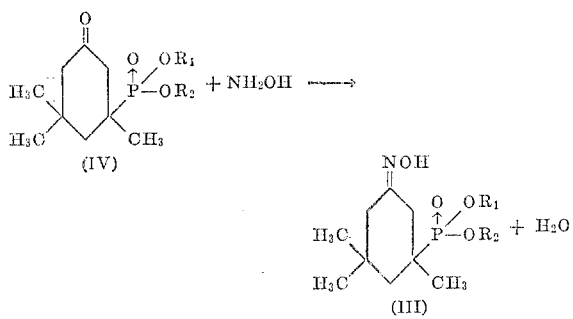

wherein $R_1$ and $R_2$ have the significance hereinbefore assigned them.

The reaction proceeds smoothly by adding stoichiometric quantities of the reactants together in an appropriate vessel with water as the solvent. The mixture is constantly stirred at room temperature while a stoichiometric quantity of sodium carbonate in water is added gradually. The mixture is thereafter stirred and then allowed to stand, whereupon the mixture separates into two layers of different specific gravity. The upper, or low specific gravity, "organic" layer which is purified further by washing with water contains compounds of the Formula III. Conventional methods of drying, and evaporation of solvent provide high yields of compounds of the Formula III.

The compounds of the Formula IV, which are used to prepare compounds of the Formula III, are, for the most part, well-known and can be prepared by methods well-known in the art. For example, the compound of Formula IV wherein $R_1$ and $R_2$ each represent hydrogen, is readily prepared by hydrolysis of those compounds of Formula IV wherein $R_1$ and $R_2$ each represent lower alkyl. This hydrolysis is readily accomplished using aqueous mineral acid such as dilute hydrochloric acid under standard deesterification conditions.

Compounds of the Formula IV wherein $R_1$ and $R_2$ are other than hydrogen [hereinafter referred to as compounds of the Formula V] are readily prepared by reacting isophorone (VI) with a phosphite compound of the formula:

(VII)

wherein X is an alkali metal such as lithium, rubidium, cesium, sodium, potassium and the like. In the above Formula VII, $R_3$ and $R_4$ when taken individually represent lower hydrocarbyl, lower halohydrocarbyl, or lower hydroxyhydrocarbyl as before defined and $R_3$ and $R_4$ taken together represent alkylene from 2 to 10 carbon atoms, inclusive, haloalkylene from 2 to 10 carbon atoms, inclusive, and hydroxyalkylene from 2 to 10 carbon atoms, inclusive, bridging the oxygen atoms to which $R_3$ and $R_4$ are attached with 1 to 3 carbon atoms of said alkylene, haloalkylene and hydroxyalkylene chain separating said oxygen atoms as hereinbefore defined.

The above reaction is illustrated by the formula:

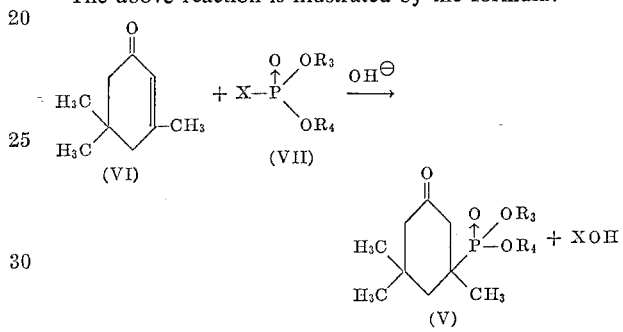

wherein $R_3$, $R_4$ and X have the significance hereinbefore assigned to them.

The reaction of compounds (VI) and (VII) can be carried out readily using, for example, the conditions described by Pudovic et al. in Zhur. Obsh. Khim., 27, page 1617 (1957) to give high yields of compounds of the Formula V.

Isophorone, also known as 3,5,5-trimethyl-3-cyclo-hexen-1-one [Formula VI], is well-known and commercially available.

The compounds of Formula VII as used herein are readily obtained by well-known methods and a number are commercially available. For illustrative purposes, gradual addition of the alkali metal such as sodium to the corresponding hydrogen phosphite in solution in an inert organic solvent yields the alkali metal substituted compounds of the Formula VII. (Kosolopoff, "Organophosphorus Compounds," pages 180–210, John Wiley, New York, N.Y., 1950.)

The reaction is illustrated by the formula:

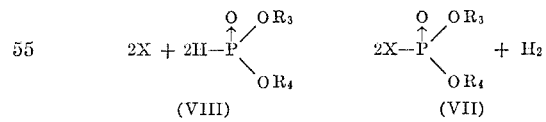

wherein X, $R_3$ and $R_4$ have the significance hereinbefore assigned to them. Alternately, compounds of the Formula VII can be prepared by reacting compounds of the Formula VIII with the alkali metal alkoxide or hydride in an inert solvent, for example sodium alcoholate in ethanol or sodium hydride in tetrahydrofuran.

Compounds of the Formula VIII are, for the most part, well-known in the art, and a number of methods for their preparation are equally well-known. In fact, a significant number of them are commercially available in quantity. In general, they are prepared by reacting phosphorus trichloride with an alcohol corresponding in structure to the desired configuration of $R_3$ and $R_4$.

The method of preparation is illustrated for example in the procedure described in Ind. Eng. Chem. 49, pages 1871–4 (1957) by Campbell et al. wherein the alcohols employed were methanol, ethanol, isopropanol, butanol, hexanol, octanol, 2-butyloctanol and cyclohexanol among others, to prepare the corresponding hydrogen phosphites wherein $R_3$ and $R_4$ when taken independently are specifically lower hydrocarbyl, as defined before, and more specifically lower alkyl.

Using similar methods, but using halogenated alcohols such as, for example, 2-chloroethanol, 1-chloro-3-propanol, 1-chloro-4-butanol and 1,2-dichlorohexanol and the like, there are prepared those dihaloalkyl hydrogen phosphites of the Formula VIII wherein $R_3$ and $R_4$ taken independently are specifically lower halohydrocarbyl as defined before and more specifically lower haloalkyl.

Other procedures for the preparation of the dialkyl hydrogen phosphites are discussed in J. Chem. Soc. 1945, pages 380–2 by H. McCombie et al. and in the text "Phosphorus and its Compounds," Van Wazer, vol. I, page 372 et seq., Interscience Publishers, New York, 1958.

Specific procedures for the preparation of compounds of the Formula VIII wherein $R_3$ and $R_4$ are aryl are illustrated for example by British Patent 835,785 for a method of preparing diphenyl hydrogen phosphite. Houalla et al. Compt. Rend 247, pages 482–5 (1958) describe the preparation of diaryl hydrogen phosphites by heating the corresponding triarylphosphite in the presence of a weak acid such as acetic acid. Employing the same methods but using tri(haloaryl) phosphites as starting compounds, the corresponding di(haloaryl)hydrogen phosphites are prepared, such as, for example, di(chlorophenyl) hydrogen phosphite and the like.

The compounds of Formula VIII wherein $R_3$ and $R_4$ taken independently are lower hydroxyhydrocarbyl are also prepared by reaction of phosphorus trichloride with the appropriate alcohol $R_3OH$ or $R_4OH$. Illustratively, the reaction of phosphorus trichloride with ethylene glycol or hydroquinone yields di(hydroxyethyl)hydrogen phosphite and di(hydroxyphenyl)hydrogen phosphite, respectively. Alternatively, to prepare the compounds of Formula VIII wherein $R_3$ and $R_4$ taken independently are lower hydroxyalkyl, the method of U.S. Pat. 2,372,244 may be used. This method consists of reaction of phosphonic acid with an alkylene oxide to yield the corresponding di(hydroxyalkyl)hydrogen phosphite.

Illustrative hydrogen phosphites of the Formula VIII which are prepared in the manner and using the methods discussed above, where $R_3$ and $R_4$ are independently lower hydrocarbyl, lower halohydrocarbyl, and lower hydroxyhydrocarbyl as hereinbefore defined, are:

dimethyl hydrogen phosphite,
O-methyl-O'-ethyl hydrogen phosphite,
diethyl hydrogen phosphite,
didocecyl hydrogen phosphite,
di(chloromethyl)hydrogen phosphite,
di(2-chloroethyl)hydrogen phosphite,
di(chloropentyl)hydrogen phosphite,
di(chlorododecyl)hydrogen phosphite,
O-chloroethyl-O'-hydroxymethyl hydrogen phosphite,
di(hydroxymethyl)hydrogen phosphite,
di(hydroxyethyl)hydrogen phosphite,
di(hydroxydodecyl)hydrogen phosphite,
diphenyl hydrogen phosphite,
ditolyl hydrogen phosphite,
dixylyl hydrogen phosphite,
dinaphthyl hydrogen phosphite,
dicyclobutyl hydrogen phosphite,
dicyclopentyl hydrogen phosphite,
dicyclohexyl hydrogen phosphite,
dicyclobutenyl hydrogen phosphite,
di(p-chlorophenyl)hydrogen phosphite,
di(m-chlorophenyl)hydrogen phosphite,
di(chlorotolyl)hydrogen phosphite,
di(chlorocyclobutyl)hydrogen phosphite,
di(chlorocyclopentyl(hydrogen phosphite,
di(chlorocyclooctyl)hydrogen phosphite,
di(chlorocyclopentenyl)hydrogen phosphite,
di(p-hydroxyphenyl)hydrogen phosphite,
di(m-hydroxyphenyl)hydrogen phosphite,
di(hydroxytolyl)hydrogen phosphite,
di(hydroxynaphthyl)hydrogen phosphite,
di(hydroxycyclobutyl)hydrogen phosphite,
di(hydroxycyclopentyl)hydrogen phosphite,
O-hydroxycyclopentyl,
O'-chlorocyclopentyl hydrogen phosphite,
di(hydroxycyclooctyl)hydrogen phosphite,
di(hydroxycyclopentenyl)hydrogen phosphite,
O-chloroethyl,
O'-hydroxycyclopentenyl hydrogen phosphite, and the like.

Compounds of the Formula VIII wherein $R_3$ and $R_4$ taken together represents alkylene from 2 to 10 carbon atoms, inclusive, haloalkylene from 2 to 10 carbon atoms, inclusive, hydroxyalkylene from 2 to 10 carbon atoms, inclusive, bridging the oxygen atoms to which $R_3$ and $R_4$ are attached with 1 to 3 carbon atoms of said alkylene, haloalkylene and hydroxyalkylene chain, as hereinbefore defined, are for the most part, well-known as is their preparation. Illustratively, the method of H. Lucas et al., J. Am. Chem. Soc., vol. 72, pages 5491–7 for the preparation of cyclic phosphites is used. Starting with a polyol having from 2 to 10 carbon atoms, inclusive, and at least two hydroxyl groups, such as, for example, 1,3-propanediol, said polyol is reacted with phosphorus trichloride while hydrogen chloride is rapidly removed from the system. The resulting cyclic chlorophosphites are hydrolized to give high yields of the desired cyclic hydrogen phosphites of the Formula VIII such as, for example, 1,3,2-dioxaphosphorinane, when the starting compound is 1,3-propanediol.

In the same manner, corresponding cyclic hydrogen phosphites [compounds of the Formula VIII wherein $R_3$ and $R_4$ taken together are alkylene from 2 to 10 carbon atoms, inclusive, bridging the oxygen atoms to which $R_3$ and $R_4$ are attached with 1 to 3 carbon atoms] are obtained when the starting compounds are, for example, ethylene glycol, 1,2-propanediol, 1,3-butanediol, 1,3-pentanediol, 2,4-hexane, 2,4-heptanediol 1,3-octanediol, 2,4-nonanediol and 2,3-decanediol, respectively. When the starting compound is a halogenated diol such as, for example, 2,2-difluoro-1,3-propanediol, 1,4-dichloro-2,3-butanediol and the like, there are obtained the corresponding cyclic hydrogen phosphites of the Formula VIII wherein $R_3$ and $R_4$ taken togeher are haloalkylene from 2 to 10 carbon atoms, inclusive, bridging the oxygen atoms to which $R_3$ and $R_4$ are attached with 1 to 3 carbon atoms.

Compounds of the Formula VIII wherein $R_3$ and $R_4$ taken together are hydroxyalkylene from 2 to 10 carbon atoms, inclusive, bridging the oxygen attached to $R_3$ and $R_4$ with 1 to 3 carbon atoms are also prepared using the method of Lucas et al. supra, but starting with polyols having more than two hydroxy groups. Examples of such starting compounds include glycerol, trimethylolpropane and pentaerythritol which yields the cyclic hydrogen phosphites 5-methylol - 1,3,2 - dioxaphospholane, 5-methyl-5-methylol - 1,3,2 - dioxaphospholane, and 5,5 - dimethylol-1,3,2-dioxaphospholane, respectively.

The following preparations and examples describe the manner and process of making and using the invention and set forth the best mode contemplated by the inventors of carrying out the invention but are not to be construed as limiting.

PREPARATION 1

To 27.6 gms. of O,O'-diethyl 3,5,5-trimethylcyclohexan-1-on-3-yl phosphonate (Pudovic et al. supra), are added 150 ml. of $H_2O$ and 21.3 gms. hydroxylamine sulfate. The solution is stirred as 17 gms. of sodium carbonate dissolved in 80 ml. of $H_2O$ is added over a 15 minute period, maintaining the reaction mixture temperature at about 22° C. to 26° C. Infrared spectral analysis indicates that the reaction is complete in about an hour. Upon cessation of stirring, the reaction mixture separates into an upper organic layer and a lower aqueous layer which is separated and extracted with benzene. The extract and the organic layer are combined, washed with $H_2O$ and dried over anhydrous sodium sulfate. Evaporation of the solvent yielded 26.9 gms. (88.5 percent theory) of crude product which when recrystallized from petroleum ether three times gave light yellow crystals of the oxime of O,O'-diethyl 3,5,5-trimethylcyclohexan-1-on-3-yl phosphonate with melting point of 106° C. to 107° C.

In an identical manner, but starting with

O,O'-di (2-chloroethyl) 3,5,5-trimethyl-cyclohexan-1-on-3-yl phosphonate;
O,O'-di (2-hydroxyethyl) 3,5,5-trimethyl-cyclohexan-1-on-3-yl phosphonate;
O,O'-dibenzyl 3,5,5-trimethyl-cyclohexan-1-on-3-yl phosphonate;
O,O'-diphenyl 3,5,5-trimethyl-cyclohexan-1-on-3-yl phosphonate;
O,O'-dicyclobutyl 3,5,5-trimethyl-cyclohexan-1-on-3-yl phosphonate;
O,O'-dicyclopentenyl 3,5,5-trimethyl-cyclohexan-1-on-3-yl phosphonate;
O,O'-di (4-chlorophenyl) 3,5,5-trimethyl-cyclohexan-1-on-3-yl phosphonate;
O,O'-di (chlorocyclobutyl) 3,5,5-trimethyl-cyclohexan-1-on-3-yl phosphonate;
O,O'-di (4-hydroxyphenyl) 3,5,5-trimethyl-cyclohexan-1-on-3-yl phosphonate;
O,O'-di (hydroxycyclobutyl) 3,5,5-trimethyl cyclohexan-1-on-3-yl phosphonate;
O,O'- (cyclic trimethylene) 3,5,5-trimethyl-cyclohexan-1-on-3-yl phosphonate;
O,O'-[cyclic-2,2-di (methylol)trimethylene] 3,5,5-trimethyl-cyclohexan-1-on-3-yl phosphonate;
O,O'-(cyclic-2,2-difluoro-trimethylene) 3,5,5-trimethyl-cyclohexan-1-on-3-yl phosphonate;
O,O'-di (chlorocyclo-pentenyl) 3,5,5-trimethyl-cyclohexan-1-on-3-yl phosphonate;
O,O'-di (hydroxycyclopentenyl) 3,5,5-trimethyl-cyclohexan-1-on-3-yl phosphonate;

there are obtained the corresponding oximes of Formula III.

PREPARATION 2

Five hundred and thirty gms. O,O'-diethyl 3,5,5-trimethyl-cyclohexan-1-on-3-yl phosphonate, 300 ml. concentrated hydrochloric acid and 300 ml. water are mixed in a suitable vessel equipped with a fractionating column. The mixture is heated to reflux temperature for 30 to 35 hours during which time hydrogen chloride is added at a rate of 200–300 cc. per minute. At the end of the above time, ethanol, water and hydrogen chloride are removed under reduced pressure leaving a semi-solid residue. The residue is boiled with 500 ml. methyl ethyl ketone, cooled, filtered and washed twice with 150 ml. methyl ethyl ketone to yield 355 gms. (84.5 percent theory) of 3,5,5-trimethyl-cyclohexan-1-on-3-yl phosphonic acid having a melting point of 160° C. to 170° C. Recrystallization twice from methyl ethyl ketone raised the melting point to 170° C. to 172° C.

The compound so obtained is converted to its oxime using the procedure described in Preparation 1.

Example 1

To 12.5 gms. of the oxime of O,O'-diethyl 3,5,5-trimethyl-cyclohexan-1-on-3-yl phosphonate prepared by the method of Preparation 1 and dissolved in 15 ml. of pyridine, said solution being cooled to about 0° C., is added over a 15 minute period, 12.5 gms. p-toluenesulfonyl chloride dissolved in 15 ml. pyridine and similarly cooled. During the addition the mixture is stirred; the reaction is exothermic. The resulting mixture is allowed to stand at room temperature for about 18 hours and thereafter is heated on a steam bath for about 1 hour. The hot reaction mixture is then poured into a vessel containing 15 ml. of 96 percent sulfuric acid and 80 gms. of ice. The resulting mixture is stirred for about 30 minutes. The product is extracted with approximately 100 ml. of chloroform and the extract is dried over anhydrous magnesium sulfate, and filtered to remove drying agent. The filtered solution is evaporated under reduced pressure.

The residual product is 14.8 gms. of a tan colored viscous liquid which is identified by infrared analysis as a mixture of O,O'-diethyl 3,5,5-trimethylhexahydro-2H-azepin-7-on-5-yl phosphonate and O,O'-diethyl 3,5,5-trimethyl-hexahydro-2H-azepin-7-on-3-yl phosphonate.

The mixture of isomers is separated using standard vapor phase chromatographic equipment, chloroform solvent and temperatures circa 200° C., into pure O,O'-diethyl 3,5,5-trimethylhexahydro-2H-azepin-7-on - 3 - yl phosphonate and O,O'-diethyl 3,5,5-trimethylhexahydro-2H-azepin-7-on-5-yl phosphonate.

Example 2

This illustrates an alternate procedure for preparing the novel compounds of the invention.

To a solution of 14.5 gms. of the oxime of O,O'-diethyl 3,5,5-trimethyl-cyclohexan-1-on-3-yl phosphonate prepared as described in Preparation 1, in 200 ml. of benzene and heated to reflux temperature of about 80° C. is added 10.5 gms. phosphorus pentachloride, gradually over a 10 minutes period. The reaction is rapid, and following completion of addition, the reaction mixture is heated to reflux temperature and the benzene solvent and phosphorus oxychloride by-product are distilled under vacuum. The orange crystalline residue has a melting point of 200° C. to 230° C. This residue is hydrolyzed in dilute 5 percent sodium hydroxide, by stirring for 30 minutes at room temperature (circa 20° C.). The resulting product is extracted with approximately 100 ml. of chloroform, and the extract is dried over anhydrous potassium carbonate. The dried extract is filtered and the filtrate is evaporated to remove chloroform. In this manner there is obtained 12 gms. of a tan colored viscous liquid identified by infrared analysis as a mixture of O,O'-diethyl 3,3,5-trimethylhexahydro-2H-azepin-7-on-5-yl phosphonate and O,O'-diethyl 3,5,5-trimethylhexahydro-2H-azepin-7-on-3-yl phosphonate.

Example 3

Using the procedure described in Example 1 but replacing the oxime of O,O'-diethyl 3,5,5-trimethyl-cyclohexan-1-on-3-yl phosphonate with the following which are prepared in accordance with the method of Preparation 1: the oximes of O,O'-di(2-chloroethyl) 3,5,5-trimethyl-cyclohexan-1-on-3-yl phosphonate;
O,O'-di(2-hydroxyethyl) 3,5,5-trimethyl-cyclohexan-1-on-3-yl phosphonate;
O,O'-diphenyl 3,5,5-trimethylcyclohexan-1-on-3-yl phosphonate;
O,O'-dicyclobutyl 3,5,5-trimethyl-cyclohexan-1-on-3-yl phosphonate;
O,O'-dicyclopentenyl 3,5,5-trimethyl-cyclohexan-1-on-3-yl phosphonate;
O,O'-di(4-chlorophenyl) 3,5,5-trimethyl-cyclohexan-1-on-3-yl phosphonate;
O,O'-di(chlorocyclobutyl) 3,5,5-trimethylcyclohexan-1-on-3-yl phosphonate,
O,O'-di(4-hydroxyphenyl) 3,5,5-trimethyl-cyclohexan-1-on-3-yl phosphonate;
O,O'-di(hydroxycyclobutyl) 3,5,5-trimethyl-cyclohexan-1-on-3-yl phosphonate;
O,O'-(cyclic trimethylene) 3,5,5-trimethylcyclohexan-1-on-3-yl phosphonate;
O,O'-[cyclic-2,2-di(methylol) trimethylene] 3,5,5-trimethyl-cyclohexan-1-on-3-yl phosphonate;
O,O'-cyclic-(2,2-difluorotrimethylene) 3,5,5-trimethyl-cyclohexan-1-on-3-yl phosphonate;

O,O'-di(chlorocyclopentenyl) 3,5,5-trimethyl-cyclohexan-1-on-3-yl phosphonate; and
O,O'-di(hydroxycyclopentenyl) 3,5,5-trimethylcyclohex-1-on-3-yl phosphonate;

there are obtained, respectively, a mixture of O,O'-di(2-chloroethyl) 3,5,5-trimethylhexahydro-2H-azepin-7-on-3-yl phosphonate and O,O'-di-(2-chloroethyl) 3,3,5-trimethylhexahydro-2H-azepin-7- a mixture of O,O'-di(2-hydroxyethyl) 3,5,5-trimethyldro-2H-azepin-7-on-3-yl phosphonate; and
hexahydro-2H-azepin-7-on-3-yl phosphonate and O,O'-di(2-hydroxyethyl) 3,5,5-trimethylhexahydro-2H-azepin-7-5-yl phosphonate;

a mixture of O,O'-diphenyl 3,5,5-trimethylhexahydro-2H-azepin-7-on-3-yl phosphonate;
and O,O'-diphenyl 3,3,5-trimethylhexahydro-2H-azepin-7-on-5-yl phosphonate;

a mixture of O,O'-dicyclobutyl 3,5,5-trimethylhexahydro-2H-azepin-7-on-3-yl phosphonate and O,O'-dicyclobutyl 3,3,5-trimethylhexahydro-2H-azepin-7-on-5-yl phosphonate;

a mixture of O,O'-dicyclopentenyl 3,3,5-trimethylhexahydro-2H-azepin-7-on-5-yl phosphonate and O,O'-dicyclopentenyl 3,5,5-trimethylhexahydro-2H-azepin-7-on-3-yl phosphonate;

a mixture of O,O'-di(4-chlorophenyl) 3,5,5-trimethylhexahydro-2H-azepin-7-on-3-yl phosphonate and O,O'-di(4-chlorophenyl) 3,3,5-trimethylhexahydro-2H-azepin-7-on-5-yl phosphonate;

a mixture of O,O'-di(chlorocyclobutyl) 3,3,5-trimethylhexahydro-2H-azepin-7-on-5-yl phosphonate and O,O'-di(chlorocyclobutyl) 3,5,5-trimethylhexahydro-2H-azepin-7-on-3-yl phosphonate;

a mixture of O,O'-di(4-hydroxyphenyl) 3,5,5-trimethylhexahydro-2H-azepin-7-on-3-yl phosphonate and O,O'-di(2-hydroxyethyl) 3,3,5-trimethylhexahydro-2H-azepin-7-on-5-yl phosphonate;

a mixture of O,O'-di(hydroxycyclobutyl) 3,3,5-trimethylhexahydro-2H-azepin-7-on-5-yl phosphonate and O,O'-di(hydroxycyclobutyl) 3,5,5-trimethylhexahydro-2H-azepin-7-on-3-yl phosphonate;

a mixture of O,O'-(cyclic trimethylene) 3,5,5-trimethylhexahydro-2H-azepin-7-on-3-yl phosphonate and O,O'-(cyclic trimethylene) 3,3,5-trimethylhexahydro-2H-azepin-7-on-5-yl phosphonate;

a mixture of O,O'-[cyclic-2,2-di(methylol)trimethylene] 3,5,5-trimethylhexahydro-2H-azepin-7-on-3-yl phosphonate and O,O'-[cyclic-2,2-di(methylol)-trimethylene] 3,3,5-trimethylhexahydro-2H-azepin-7-on-5-yl phosphonate;

a mixture of O,O'-(cyclic-2,2-difluorotrimethylene) 3,5,5-trimethylhexahydro-2H-azepin-7-on-3-yl phosphonate and O,O'-(cyclic-2,2-difluoro-trimethylene) 3,3,5-trimethylhexahydro-2H-azepin-7-on-5-yl phosphonate;

a mixture of O,O'-di(chlorocyclopentenyl) 3,3,5-trimethylhexahydro-2H-azepin-7-on-5-yl-phosphonate and O,O'-di(chlorocyclopentenyl) 3,5,5-trimethylhexahydro-2H-azepin-7-on-3-yl phosphate; and a mixture of O,O'-di(hydroxycyclopentenyl) 3,3,5-trimethylhexahydro-2H-azepin-7-on-5-yl phosphonate and O,O'-di(hydroxycyclopentenyl) 3,5,5-trimethylhexahydro-2H-azepin-7-on-3-yl phosphonate.

The various mixtures so obtained are separated into their component parts using vapor phase chromatography as described in Example 1.

Example 4

Using the procedure described in Example 1, but replacing the oxime of O,O'-diethyl 3,5,5-trimethylcyclohexan-1-on-3-yl phosphonate with the oxime of 3,5,5-trimethylcyclohexan-1-on-3-yl phosphonic acid (prepared as described in Preparation 2), there is obtained a mixture of 3,3,5-trimethylhexahydro - 2H - azepin-7-on-5-yl phosphonic acid and 3,5,5-trimethylhexahydro-2H-azepin-7-on-3-yl phosphonic acid. The mixture is separated into its component parts using vapor phase chromatography as described in Example 1.

We claim:
1. A composition comprising a mixture consisting essentially of compounds of the formulae:

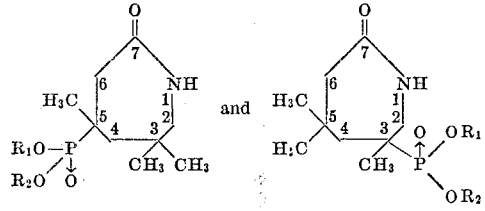

wherein $R_1$ and $R_2$ taken individually are members selected from the group consisting of
(A) hydrogen, and (B) hydrocarbyl, substituted by from 0 to 3 members selected from the group consisting of halogen and hydroxyl; wherein hydrocarbyl (B) is a member selected from the group consisting of alkyl from 1 to 12 carbon atoms; aralkyl from 7 to 11 carbon atoms; aryl from 6 to 12 carbon atoms; cycloalkyl from 4 to 8 carbon atoms and cycloalkenyl from 5 to 8 carbon atoms; and when taken together are alkylene from 2 to 10 carbon atoms, inclusive, substituted by from 0 to 3 members selected from the group consisting of halogen and hydroxyl; bridging the oxygen atoms to which $R_1$ and $R_2$ are attached with 1 to 3 carbon atoms of said alkylene.

2. A compound of the formula:

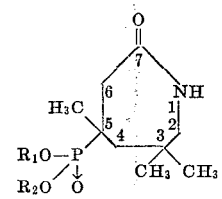

wherein $R_1$ and $R_2$ taken individually are members selected from the group consisting of
(A) hydrogen, and (B) hydrocarbyl, substituted by from 0 to 3 members selected from the group consisting of halogen and hydroxyl; wherein hydrocarbyl (B) is a member selected from the group consisting of alkyl from 1 to 12 carbon atoms; aralkyl from 7 to 11 carbon atoms; aryl from 6 to 12 carbon atoms; cycloalkyl from 4 to 8 carbon atoms and cycloalkenyl from 5 to 8 carbon atoms; and when taken together are alkylene from 2 to 10 carbon atoms, inclusive, substituted by from 0 to 3 members selected from the group consisting of halogen and hydroxyl; bridging the oxygen atoms to which $R_1$ and $R_2$ are attached with 1 to 3 carbon atoms of said alkylene.

3. The compound of claim 2 wherein $R_1$ and $R_2$ are each ethyl, said compound being O,O'-diethyl 3,3,5-trimethylhexahydro-2H-azepin-7-on-5-yl phosphonate.

4. A compound of the formula:

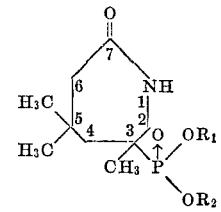

wherein $R_1$ and $R_2$ taken individually are members selected from the group consisting of
(A) hydrogen, and (B) hydrocarbyl, substituted by from 0 to 3 members selected from the group consisting of halogen and hydroxyl; wherein hydrocarbyl (B) is a member selected from the group consisting of alkyl from 1 to 12 carbon atoms; aralkyl from 7 to 11 carbon atoms; aryl from 6 to 12 carbon atoms; cycloalkyl from 4 to 8 carbon atoms and cycloalkenyl from 5 to 8 carbon atoms; and when taken together are alkylene from 2 to 10 carbon atoms, inclusive, substituted by from 0 to 3 members selected from the group consisting of halogen and hydroxyl; bridging the oxygen atoms to which $R_1$ and $R_2$ are attached with 1 to 3 carbon atoms of said alkylene.

5. The compound of claim 4 wherein $R_1$ and $R_2$ are each ethyl, said compound being O,O'-diethyl 3,5,5-trimethylhexahydro-2H-azepin-7-on-3-yl phosphonate.

References Cited
UNITED STATES PATENTS 3,459,738   8/1969   Morren _____ 260—239.3

HENRY R. JILES, Primary Examiner

R. T. BOND, Assistant Examiner

U.S. Cl. X.R.

106—15FP